United States Patent [19]

Schmidt

[11] Patent Number: 4,840,227

[45] Date of Patent: Jun. 20, 1989

[54] PROCESS FOR PRODUCING A HOLLOW FIBER MASS TRANSFER MODULE AND MODULE PRODUCED BY THIS PROCESS

[75] Inventor: Wolf-Dieter Schmidt, Lübeck, Fed. Rep. of Germany

[73] Assignee: Draegerwerk AG, Fed. Rep. of Germany

[21] Appl. No.: 166,876

[22] Filed: Mar. 14, 1988

Related U.S. Application Data

[62] Division of Ser. No. 112,667, Oct. 22, 1987, Pat. No. 4,769,146.

[30] Foreign Application Priority Data

Oct. 28, 1986 [DE] Fed. Rep. of Germany ....... 3636583

[51] Int. Cl.$^4$ ............................................. F28D 7/00
[52] U.S. Cl. ................................. 165/162; 165/158; 210/321.8; 210/321.81
[58] Field of Search ............... 165/162, 180, 905, 158, 165/70; 210/321.8, 321.81, 321.89, 321.9, 500.23

[56] References Cited

U.S. PATENT DOCUMENTS

| | | | |
|---|---|---|---|
| 3,838,776 | 10/1974 | Brun et al. | 210/321.9 |
| 4,398,595 | 8/1983 | Small | 165/162 |
| 4,480,683 | 11/1984 | Wollbeck et al. | 165/180 |
| 4,591,439 | 5/1986 | Grot | 210/321.81 |

FOREIGN PATENT DOCUMENTS 2444540 3/1975 Fed. Rep. of Germany ....................... 210/321.81

Primary Examiner—Albert J. Makay
Assistant Examiner—Noah Kamen
Attorney, Agent, or Firm—McGlew & Tuttle

[57] ABSTRACT

A process for producing a hollow fiber mass transfer module with a number of hollow fibers sealed into a housing is improved according to the invention with regard to the development of a desirable flow space in the surface area of the hollow fibers by the fact that a spacing material is applied to the outsides of the hollow fibers before their insertion into the housing (2). The thickness of the material is chosen to conform to the desired separation of the hollow fibers. The hollow fibers are arranged substantially parallel and inserted as a bundle into the housing and are fixed with the grout. The spacing material can have a layered or particulate and granular form. A hollow fiber mass transfer module produced by the process pursuant to the invention has hollow fibers suitably arranged at uniform mutual spacings.

5 Claims, 3 Drawing Sheets

PROCESS FOR PRODUCING A HOLLOW FIBER MASS TRANSFER MODULE AND MODULE PRODUCED BY THIS PROCESS

This is a division of application Ser. No. 112,667, filed Oct. 22, 1987, now U.S. Pat. No. 4,769,146.

FIELD AND BACKGROUND OF THE INVENTION

This invention relates to respirator mass transfer devices such as heat exchanges and in particular to a new and useful hollow fiber mass transfer module and to a module construction.

This invention concerns a process for producing a hollow fiber mass transfer module in which a number of parallel hollow fibers are introduced into a housing and are tightly sealed to one another and to the inner wall of the housing with grout, with a first flow space being formed between the inner wall of the housing and the outsides of the hollow fibers, which is separated from the second flow space determined by the internal volumes of the hollow fibers. A module produced by this process is also described.

Hollow fiber mass transfer modules are produced in numerous different forms. Elongated, essentially cylindrical housing shapes are known, in which the hollow fibers extend coaxially with the housing from one end to the other. Designs of modules are also known in which the hollor fibers run in loops in the housing, so that the inlet and outlet openings are essentially in one plane.

Such hollow fiber mass transfer modules are used for selective mass transfer between two fluids (gas, liquid). One fluid flows in a first flow space on the outside of the hollow fibers, while the other fluid is contained in the second flow spaced determined by the internal volume of the hollow fibers. Since the walls of the hollow fibers preferably consist of semipermeable membranes, a selective passage of substances from one fluid into the other is possible.

Hollow fiber mass transfer modules, called "hollow fiber modules" below, are used in the medical sector in dialyzers, and in hemofiltration, and for other purposes.

Another application is in air humidifiers, which are used, for example, in combination with equipment for artificial respiration. Such respiratory humidifiers are described in German Pat. No. 26 17 985 and in European Pat. No. B1 0 009 543. In such hollow fiber modules used as respiratory humidifiers, relatively large amounts of a substance (water) and thermal energy are interchanged. In the same way, the module should have relatively low flow resistance in both flow spaces.

While the second flow space determined by the internal volumes of the hollow fibers can easily be enlarged by using hollow fibers with a relatively large diameter, or by a larger number of hollow fibers connected in parallel, difficulties arise in keeping the flow resistance relatively low between the outside of the hollow fibers, i.e., in the first flow space. If the elastic hollow fibers do not assume perfectly mutual separation and partly rest against one another, the flow resistance is substantially increased. Increasing the separation of the hollow fibers, which would preclude mutual contact, leads to an undesirable increase of the dimensions of the device.

Various ways of improving the flow characteristics on the outsides of the hollow fibers are known. Thus, for example, guide ribs have been incorporated into the housing that force a flow in the transverse direction. European Pat. No. A 0 005 866 provides for a hollow fiber module usable in combination with an artificial lung in which the hollow fibers are contracted in the central area of the module in order to avoid so-called "channeling", i.e., the occurrence of intensified flow between the bundle of hollow fibers and the housing wall. However, the aforementioned measures are inadequate, especially in cases in which high requirements are placed on the mass transfer with small dimensions of the hollow fiber module.

SUMMARY OF THE INVENTION

The invention provides an increased mass transfer capacity of hollow fiber modules by improving the flow conditions on the outside of the hollow fibers, without thereby enlarging the dimensions.

According to the invention, a separating material is applied on the outsides of the hollow fibers before insertion into the housing. The thickness of the material is chosen to conform to the desired separation of the hollow fibers, and by inserting the hollow fibers as a bundle into the housing and fixing them with the grout.

A defined mutual separation of the hollow fibers in the module is assured by the use of the process pursuant to the invention, and thus also a uniform flow around them with transverse exchange. The formation of intensified flow along the inner wall of the housing because of the high flow resistance between the hollow fibers, which can contribute only slightly to the exchange capacity of the hollow fiber module, is also avoided.

"Separating material" in connection with the invention is intended to mean a very wide variety of regularly or irregularly shaped particles, for example in the form of balls or fragments, as well as material distributions developed in layers. It must be provided during the application of the separating material that particles, or the like, remaining on the outsides of the hollow fibers permit an adequate size of the flow space.

A desirable refinement of the invention can provide for at least partly leaching out the separating material after mixing the hollow fibers, to clear the flow space between the hollow fibers.

The leaching can be done in various ways, for example, by mechanically floating the particles of the separating material or of the coating away, or blowing them out, or by dissolving the particles or the coating with aqueous or organic solvents. Care must be taken in this case that the solvent does not attack either the hollow fibers or the grout.

The use of granular crystalline particles such as salts seems to be preferable, for which physiologically harmless substances such as NaCl, $MgSO_4 \cdot H_2O$ can be used in particular. This particulate separating material is particularly easily applied by moistening the hollow fibers in a flow of steam and then immediately scattering the water-soluble particulate material on them.

A beneficial embodiment of the process comprises using regularly or irregularly shaped plastic particles, with which the adhesive bonding to the hollow fibers is produced by electrostatic charging.

In a desirable embodiment of the process, a high-viscosity adhesive material in the liquid state that can be drawn into filaments can be used as the separating material; it can be drawn from a nozzle as thin filaments approximately 0.1 to 1 mm in diameter, and distributed over a bundle of fibers spread out flat, in several strips approximately across the running direction of the fibers.

Before the material has completely solidified, the fibers are taken apart from one another so that spots of adhesive remain on the individual fibers, in which the separating material solidifies.

A very wide variety of forms of embodiments of hollow fiber modules can be produced by the process described; the embodiment in which the hollow fibers are arranged at uniform mutual distances seems to be particularly desirable.

Accordingly, it is an object of the invention to provide an improved process producing a hollow fiber mass transfer module or heat exchanger which comprises positioning a spacing material between the hollow fiber and arranging them in a bundle so that their axis is substantially parallel and that they are at uniformed spacing from each other, introducing the bundle into a housing, and applying a grout adjacent the end of the fibers to bind them in position relative to each other and to said housing.

A further object of the invention is to provide a module such as a heat exchanger which comprises a tubular housing having a plurality of fibers therein separated by a spacing material secured in position relative to each other and to the housing by grouting adjacent the ends thereof and which advantageously includes a connecting fitting at each end of the housing having more passages therein which are aligned with the flow passages through the hollow fibers and which also includes connecting fittings in the sidewalls of the housing for flow passages around the fibers.

The further object of the invention is to provide a module for heat exchanges which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
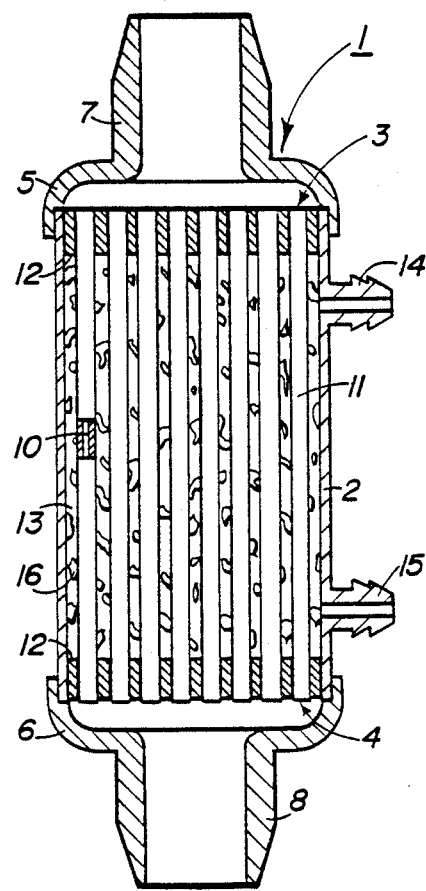
FIG. 1 is an axial cross sectional view of a hollow fiber module in the form of respiratory humidifier constructed in accordance with the invention.

Referring to the drawings in particular, the invention therein comprises a module construction generally designated 1 and a process of producing the module using a plurality of hollow fiber tubular member.

The hollow fiber module illustrated in FIG. 1 includes a cylindrical housing 2 with two circular cutouts 3, 4. Sealed caps 5 and 6 are placed on respective ends over the cutouts 3 and 4. Each of the caps 5 and 6 is provided with a connector 7 or 8 that are coaxial to the cylindrical housing 2.

A number of essentially parallel hollow fibers 11 are arranged in the housing 2, each of which is tightly sealed to the others and to the inner wall of the housing 2 by layers of grout 12 in the area of their inlet and outlet openings. Connector fittings 14 and 15 are provided in the wall of the housing 2 to form a first flow space 13. A second flow space 10 is formed by the internal volumes of the hollow fibers 11.

The hollow fibers are drawn greatly enlarged in FIG. 1. Actually, there are a number of very thin hollow fibers present, with hollow fibers made of polysulfone preferably being used in the case of the respiratory humidifier illustrated, which have an inside diameter of 1 mm to 3 mm and a wall thickness of 0.05 mm to 0.2 mm. A hollow fiber module in this case generally contains several hundred hollow fibers.

The uniform separation of the hollow fibers 11 is assured by the separating material particles 16 lying against the outsides of the hollow fibers 11, at least in the production process.

Figure 2:
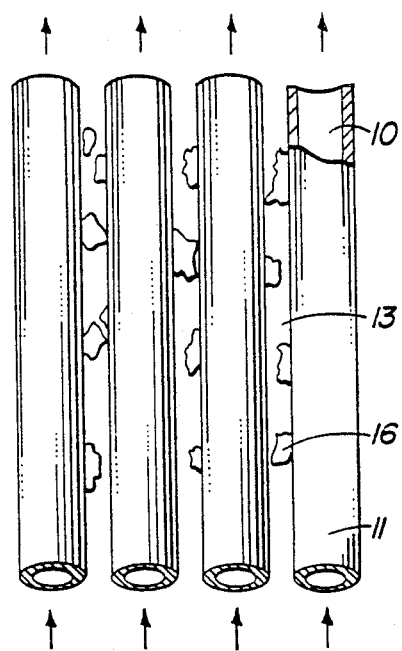
FIG. 2 is partial elevational and sectional view of a portion of the hollow fiber packing in a module according to FIG. 1.
Figure 3:
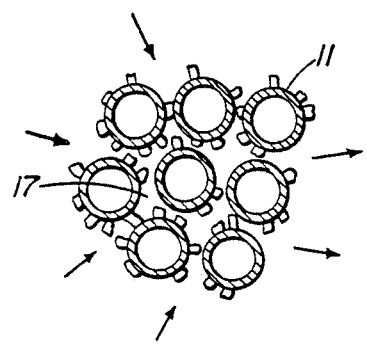
FIG. 3 is a transverse sectional view of the arrangement of FIG. 2.

The arrangement of the separating material and its distribution between the hollow fibers 11 can be seen in FIGS. 2 and 3. The separating material particles are irregular in FIG. 2, but are made with essentially the same largest cross-sectional dimension. An approximately uniform separation between the hollow fibers is achieved by the large number of particles 16 arranged between the hollow fibers, even though granular particles have only approximately the same grain size.

FIG. 2 shows that a substantially improved transverse flow between the hollow fibers is possible on the basis of the production process pursuant to the invention. While the hollow fibers in the modules known heretofore sometimes rest tightly against one another, a prescribed minimum separation is guaranteed by an embodiment pursuant to the invention. Because of this, longitudinal channels 17 are formed, through which flows the liquid, flowing around the outsides of the hollow fibers.

As mentioned, the separating material particles 16 according to one form of embodiment of the process pursuant to the invention can be removed from the module after the grouting. This method is particularly desirable when the hollow fibers have sufficient stability so that they retain their positions in the module after the separating particles are removed.

Figure 4:
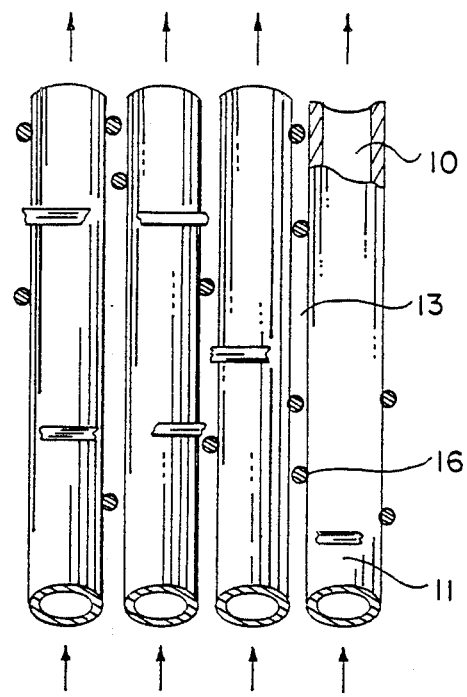
FIG. 4 is a partial elevational and sectional view of a portion of the hollow fiber packing in a module according to a further embodiment of the invention.
Figure 5:
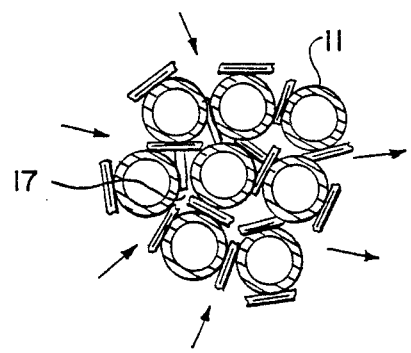
FIG. 5 is a transverse sectional view of the arrangement of FIG. 4.

According to another embodiment of the invention, as shown in FIGS. 4 and 5, a high viscosity adhesive material in a liquid state may be drawn into filaments and may be used as the separating material. This high viscosity adhesive material may be drawn from a nozzle as thin filaments 16' which have a diameter between 0.1 to 1 mm. These filaments are distributed over a bundle of fibers, spread out flat, in several strips, approximately across the running direction of the fibers. Before the material is completely solidified, the fibers are taken apart from one another so that spots of adhesives 16' remain on the individual fibers, in which the separating material solidifies.

While specific embodiments of the invention have been shown and described in detail to illustrate the application of the principles of the invention, it will be understood that the invention may be embodied otherwise without departing from such principles.

I claim:

1. A mass heat exchanger comprising a cylindrical housing having an opening at each end, a cap closing each opening having axially aligned tubular connector portions for respective inlet and outlet fluid flow, a plurality of axially extending tubular fibers positioned in said housing and defining a second flow space in their interior volumes, a grout material in said housing adjacent each of the ends of said tubular fibers separating said fibers and securing them in axially aligned positions relative to said housing and defining a first flow space between the grout material of the ends of said fibers, a multiplicity of dispersed separating particles disposed in said first flow space and attached along the lengths of said fibers, providing a separate tubular fiber orientation, and an inlet and outlet connected into a side of said cylindrical housing communicating with said first flow space.

2. A mass heat exchanger according to claim 1, wherein said tubular fibers comprise polysulfone.

3. A mass heat exchanger according to claim 1 wherein the separating particles are thin filament portions.

4. A mass heat exchanger according to claim 3, wherein said thin filament portions are adhered to the tubular fibers.

5. A mass heat exchanger according to claim 1, wherein: said separating particles have essentially the same largest cross-sectional dimension.

* * * * *